(12) United States Patent
Kharbutli (10) Patent No.: US 11,535,199 B2
(45) Date of Patent: Dec. 27, 2022

(54) FLUID VENT ADAPTER FOR RESERVOIR

(71) Applicant: ABC TECHNOLOGIES INC., Toronto (CA)

(72) Inventor: Rani Kharbutli, Pickering (CA)

(73) Assignee: ABC TECHNOLOGIES INC., Toronto (CA)

( * ) Notice: Subject to any disclaimer, the term of this patent is extended or adjusted under 35 U.S.C. 154(b) by 0 days.

(21) Appl. No.: 17/154,384

(22) Filed: Jan. 21, 2021

(65) Prior Publication Data

US 2021/0229637 A1    Jul. 29, 2021

Related U.S. Application Data

(60) Provisional application No. 62/965,368, filed on Jan. 24, 2020.

(51) Int. Cl.
*B60S 1/50* (2006.01)
*B60S 1/52* (2006.01)

(52) U.S. Cl.
CPC .. *B60S 1/50* (2013.01); *B60S 1/52* (2013.01)

(58) Field of Classification Search
CPC .................................... B60S 1/50; B60S 1/52
USPC ................................................ 141/59, 2, 85
See application file for complete search history.

(56) References Cited

U.S. PATENT DOCUMENTS

| | | | |
|---|---|---|---|
| 8,028,729 B2 * | 10/2011 | Kaempf | B67D 7/005 |
| | | | 251/149.6 |
| 9,388,034 B2 * | 7/2016 | Hearon | B67D 7/0283 |
| 2016/0069726 A1 | 3/2016 | Pettigrew | |
| 2020/0198457 A1 | 6/2020 | Allan | |

FOREIGN PATENT DOCUMENTS

KR        200165688 Y1    1/2000

\* cited by examiner

*Primary Examiner* — Timothy L Maust
(74) *Attorney, Agent, or Firm* — Medler Ferro Woodhouse & Mills PLLC (57) ABSTRACT

A fluid vent adapter for filling a reservoir is disclosed. The vent adapter includes a primary body having an upper portion and a lower portion, a central fill conduit for delivering a fluid into the reservoir, and a plurality of vent channels for permitting the egress of air from the reservoir during filling. The central fill conduit is connected to a plurality of radially spaced dispensing holes arranged on the lower portion. Upon inserting the vent adapter into an inlet port on the reservoir, a least a portion of the radially spaced dispensing holes are blocked. An outside diameter of the lower portion is dimensioned for a close tolerance fit relative to an inside diameter of the inlet port of the reservoir, to establish a substantially sealed relationship between the inside diameter and the dispensing holes being blocked.

20 Claims, 8 Drawing Sheets

FLUID VENT ADAPTER FOR RESERVOIR

CROSS-REFERENCE TO RELATED APPLICATIONS

This application claims the benefit of prior U.S. Application Ser. No. 62/965,368, filed Jan. 24, 2020, which is hereby incorporated by reference in its entirety for all purposes.

FIELD OF THE INVENTION

The present invention relates to the field of fluid management, and in particular to a fluid vent adapter suitable for a rapid fill operation used in the filling of a fluid reservoir, for example as found on a motor vehicle.

BACKGROUND OF THE INVENTION

The drive towards the efficient use of space has created certain challenges in the automotive industry, in particular with respect to the engine compartment. While fluid reservoirs were traditionally positioned at easy-to-access locations, this oftentimes resulted in wasted space and/or a compromise in terms of available fluid volumes.

Fluid reservoirs used in modern automobiles take into consideration efficient packaging of engine components, oftentimes incorporating fluid delivery conduits that connect a fill port that may be remotely distant from the larger fluid-holding portion of the reservoir. In certain instances, the fluid conduits used to fill these reservoirs are positioned in a manner that is close to horizontal, presenting certain venting and drainage issues may interfere with the ability to rapid-fill these reservoirs.

As the industry moves towards vehicles having a plethora of sensors to detect a range of operating parameters, the demand for fluids, for example cleaning fluids will increase. This will especially be the case with the autonomous or semi-autonomous vehicles. Accordingly, there is a need to provide better options for fluid management, in particular for certain fluid-filling tasks that may be prone to drainage or venting issues due to packaging constraints.

SUMMARY OF THE INVENTION

According to an aspect of an embodiment, provided is a fluid vent adapter for filling a reservoir. The vent adapter comprises a primary body including an upper portion and a lower portion, a central fill conduit for delivering a fluid into the reservoir, and a plurality of vent channels for permitting the egress of air from the reservoir during filling. The central fill conduit is connected to a plurality of radially spaced dispensing holes arranged on the lower portion. Upon inserting the vent adapter into an inlet port on the reservoir, a least a portion of the radially spaced dispensing holes are blocked. An outside diameter of the lower portion is dimensioned for a close tolerance fit relative to an inside diameter of the inlet port of the reservoir, to establish a substantially sealed relationship between the inside diameter and the dispensing holes being blocked.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

Specific embodiments of the present invention will now be described with reference to the figures. The following detailed description is merely exemplary in nature and is not intended to limit the invention or the application and uses of the invention. A person skilled in the relevant art will recognize that other configurations and arrangements can be used without departing from the scope of the invention. Although the description of the embodiments hereof is in the context of automotive windshield washer fluid reservoirs, the invention may also be used in association with other fluid reservoirs for automotive and non-automotive use. Furthermore, there is no intention to be bound by any expressed or implied theory presented in the preceding technical field, background, brief summary or the following detailed description.

Figure 1:
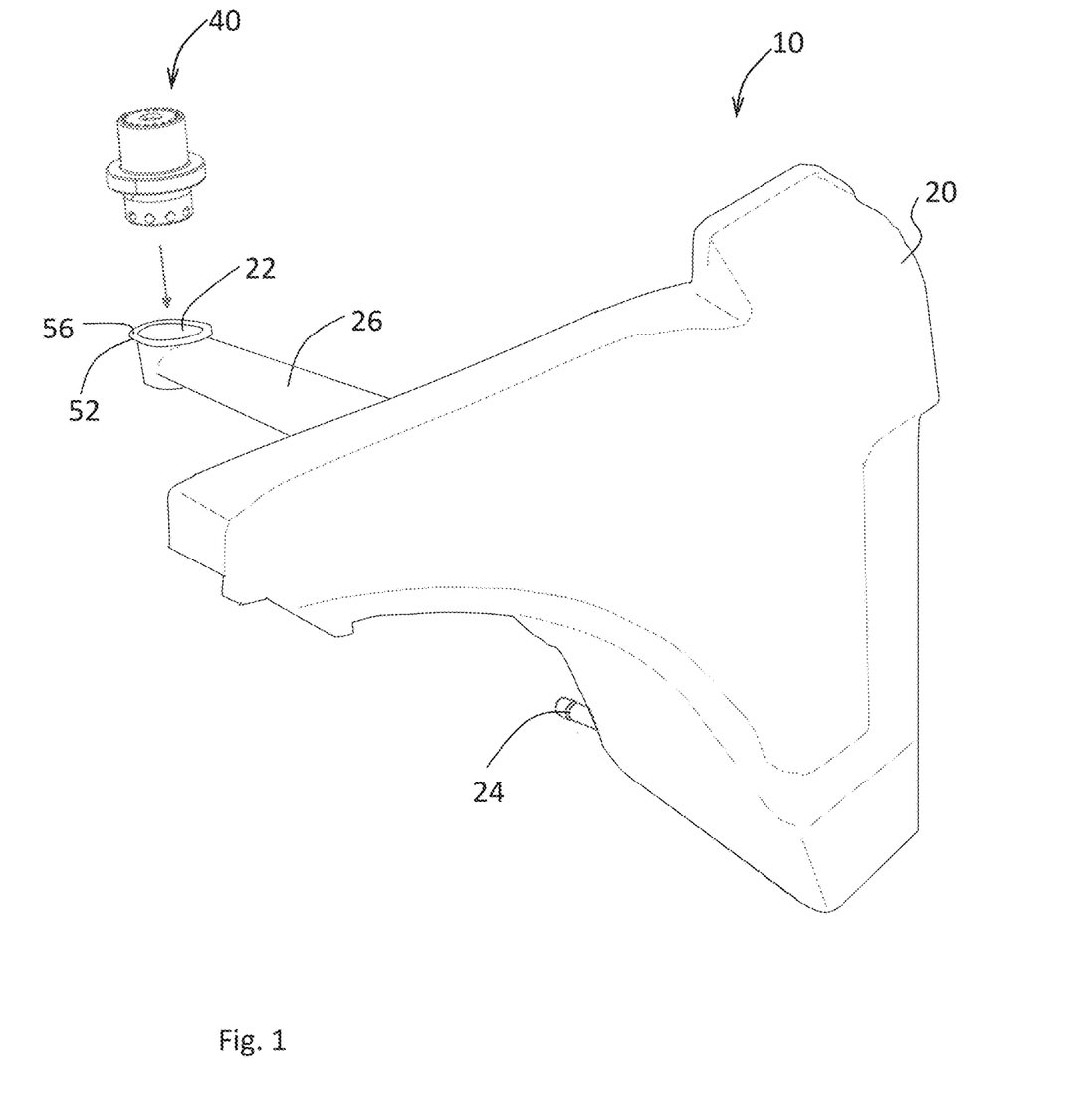
FIG. 1 is a perspective view of a windshield washer reservoir having an inlet port on a generally horizontal extension tube.

Presented in FIG. 1 is an exemplary windshield washer reservoir 10 that includes a hollow vessel 20, an inlet port 22, and an outlet port 24. The hollow vessel 20 is configured to hold a volume of washer fluid, and while shown in one particular configuration, this is merely exemplary. In the embodiment shown, the inlet port 22 is located on an upper portion of the hollow vessel 20 and permits for filling the hollow vessel 20 with washer fluid. The inlet port 22 is located on an extension tube 26 that extends between the hollow vessel 20 and an area within the engine compartment designated as the fill location for the washer fluid. The fill location is generally defined in accordance with the available space within the engine compartment. As shown, the extension tube 26 extends in a generally horizontal configuration, with a slight downward orientation (in the direction away from the inlet port 22) to permit for fluid drainage towards the hollow vessel 20. The outlet port 24 is located in a lower portion of the hollow vessel 20 and is configured for delivery of washer fluid to one or more washer nozzles via a pump (not shown). As will be appreciated, the location of the various reservoir components may be varied, as a wide range of configurations are possible, as generally dictated by the particular installation.

The generally horizontal configuration of the extension tube 26 can present certain challenges during a rapid fill procedure, for example as performed during the initial fluid fill operation at the automotive assembly plant. Rapid fill operations are performed by a fluid filling machine, configurations of which are known in the art. In general, the fluid filling machine includes a fluid dispensing interface having the form of a fill wand. Fill wands have traditionally been configured to dispense into a generally vertical fill tube, therein taking advantage of gravity to assist in fluid drainage and delivery to the reservoir associated therewith. The generally horizontal extension tube 26 located on the reservoir 10 presents a challenge, as the fluid passing therethrough has the potential for drainage and venting issues, in particular when fluid is delivered at a rapid rate as is generally the case with fluid filling machines.

To facilitate washer fluid delivery into the reservoir 10, and in particular to improve the fluid flow and drainage through the generally horizontal extension tube 26, a fluid vent adapter 40 is used. The fluid vent adapter 40 serves as an interface between the discharge end of the fill wand of the fluid filling machine, and the inlet port 22 of the reservoir 10.

Figure 2:
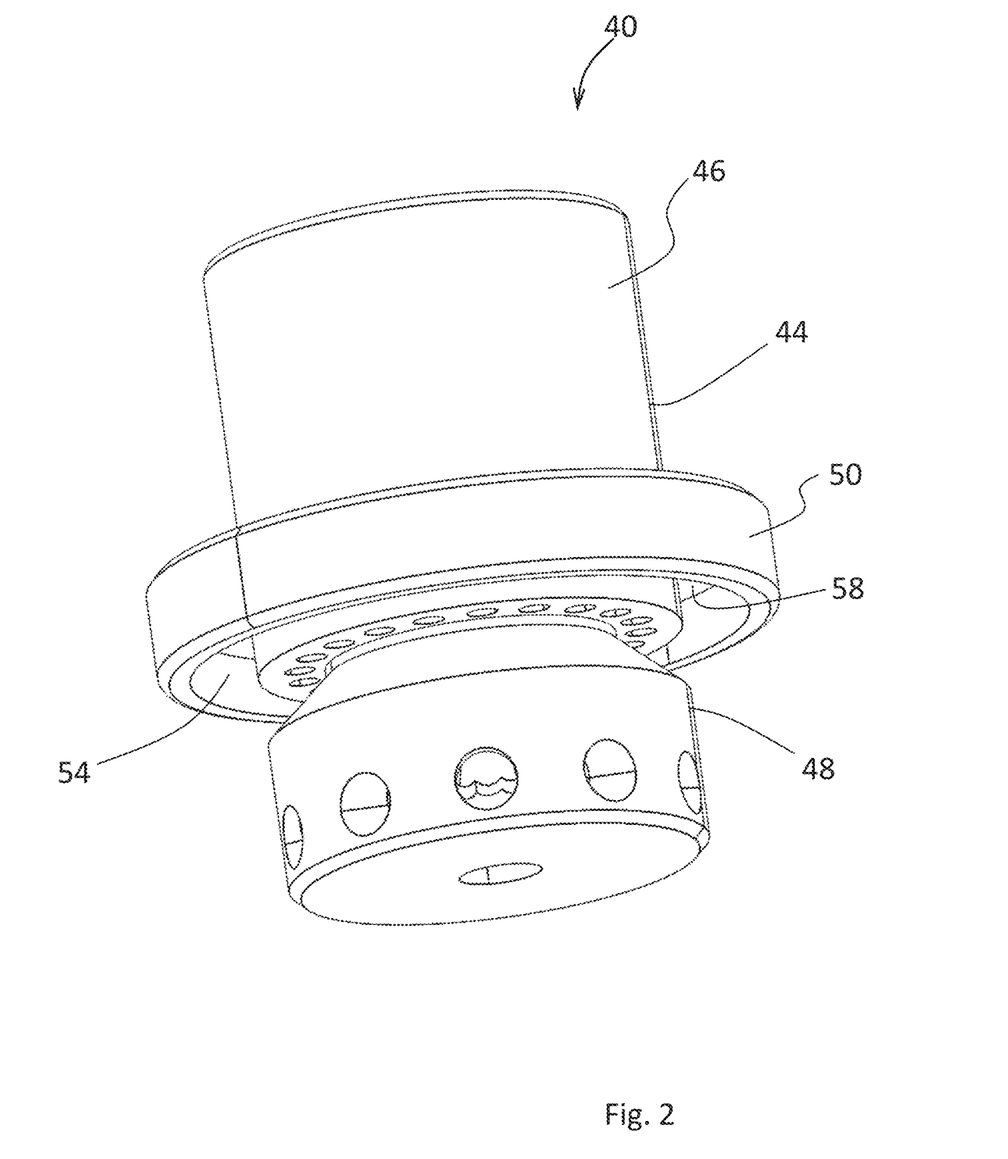
FIG. 2 is a first perspective view of a fluid vent adapter for use with the windshield washer reservoir shown in FIG. 1.
Figure 3:
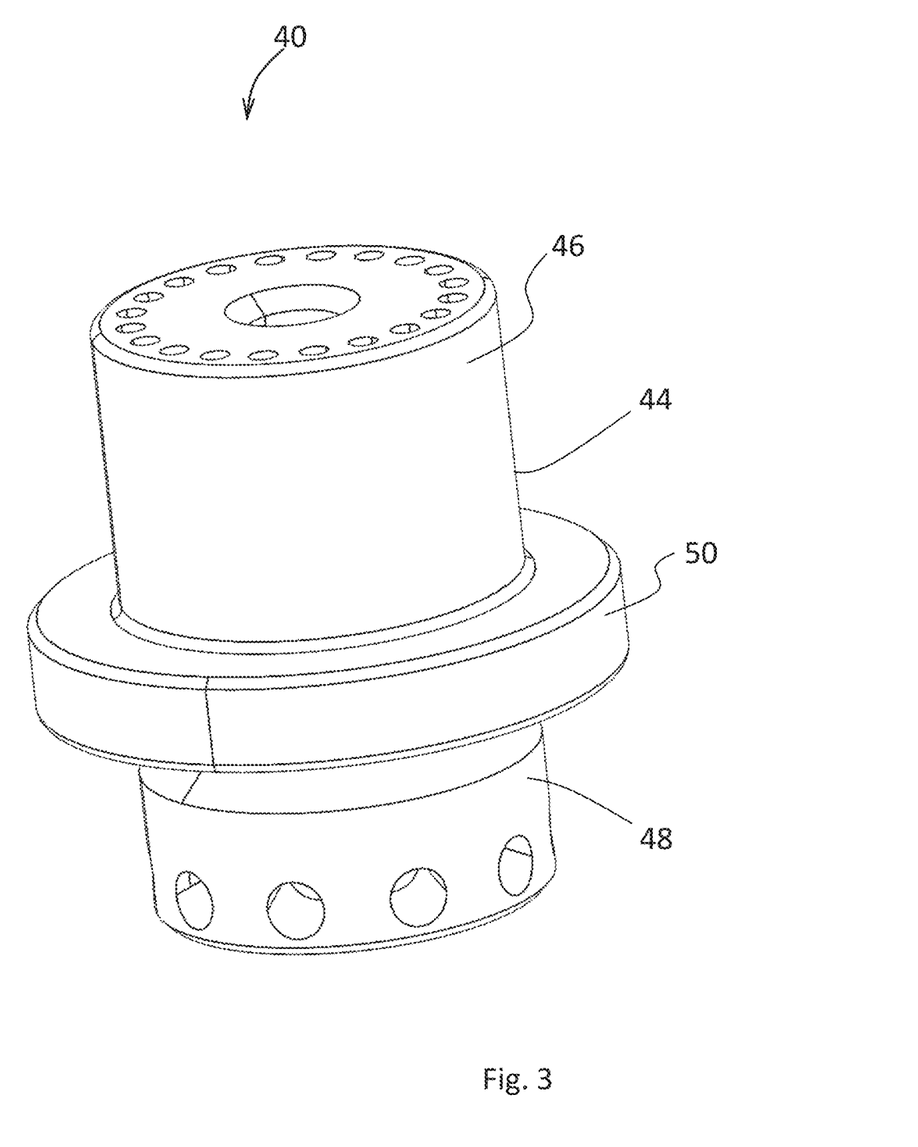
FIG. 3 is a second perspective view of the fluid vent adapter according to the embodiment shown in FIG. 2.

One exemplary embodiment of a fluid vent adapter 40 is shown in FIGS. 2 and 3. The fluid vent adapter 40 includes a primary body 44 that is subdivided into an upper portion 46 and a lower portion 48. The upper portion 46 is configured to be releasably attachable, or otherwise interfaceable to an output end of a selected fill wand of the fluid filling machine. The lower portion 48 is configured to be releasably attachable, or otherwise interfaceable to the inlet port 22 of the reservoir 10.

The upper portion 46 and the lower portion 48 are generally delimited by an annular seat 50. The annular seat 50 is configured to interface with a rim 52 formed as part of the inlet port 22 of the reservoir 10. To achieve this, an underside of the annular seat 50 includes an annular recess 54 that is dimensioned to receive the rim 52. On insertion of the fluid vent adapter 40 into the inlet port 22 (as shown in cross-section in FIG. 7), an upper sealing surface 56 of the rim 52 contacts a recess sealing surface 58 of the annular recess 54, establishing a generally secure interface therebetween.

Figure 4:
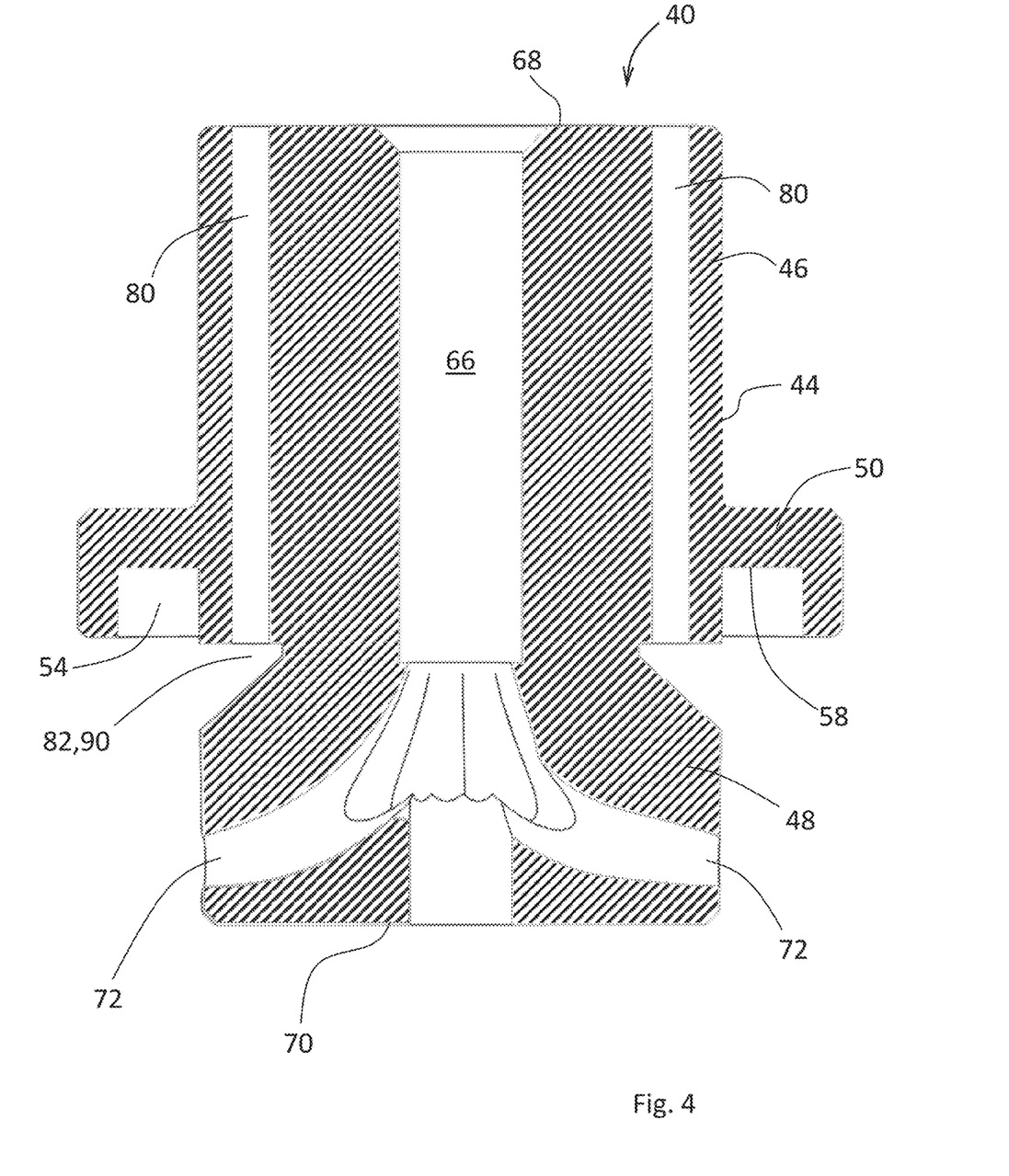
FIG. 4 is a side sectional view of the fluid vent adapter according to the embodiment shown in FIG. 2.

The fluid vent adapter 40 permits for the delivery of washer fluid from the fill wand, into the reservoir 10, while at the same time permitting for the venting of air out from the reservoir 10, as the interior volume is filled. To achieve this, with reference now to FIG. 4, the primary body 44 includes a fill conduit 66 that extends completely through the primary body 44 from a top end 68 situated on the upper portion 46, through to a bottom end 70 situated on the lower portion 48. Within the lower portion 48, the fill conduit 66 is additionally connected to a plurality of radially spaced dispensing holes 72. In the embodiment shown, ten radially spaced dispensing holes 72 are shown, although it will be appreciated that a greater or few number of radially spaced dispensing holes 72 may be implemented. As will be described in greater detail below, the radially spaced dispensing holes 72 serve to redirect at least a portion of the fluid being dispensed into a generally horizontal flow path on egress from the lower portion 48 of the fluid vent adapter 40. To permit for the requisite venting of the reservoir 10 on being filled, the fluid vent adapter 40 includes a plurality of vent channels 80 that extend completely through the upper portion 46 of the primary body 44, from an annular vent channel 82 proximal the annular seat 50, upwards to the top end 68 situated on the upper portion 46. In the embodiment shown, 20 vent channels 80 are shown, although it will be appreciated that a greater or few number of vent channels 80 may be implemented.

Figure 5:
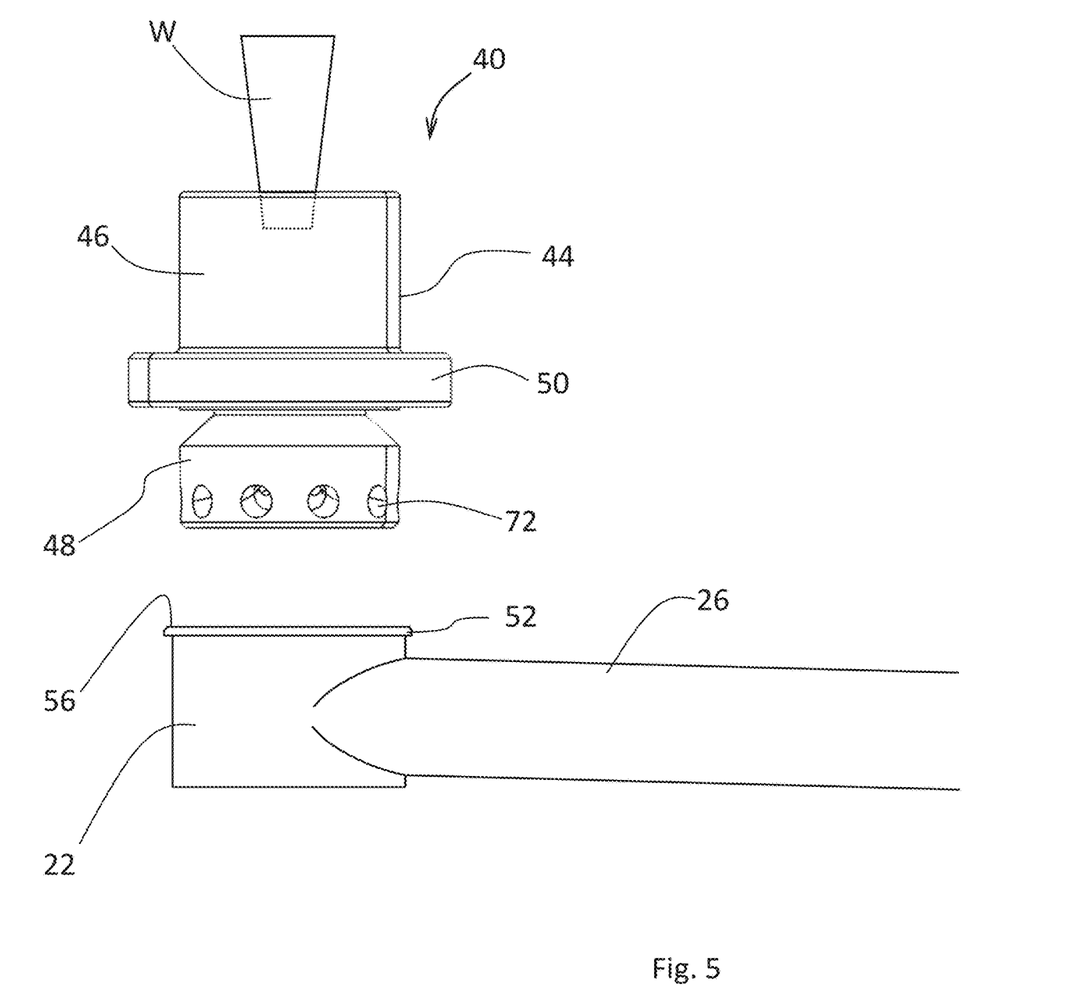
FIG. 5 illustrates the fluid vent adapter according to the embodiment shown in FIG. 2, where the fluid vent adapter is aligned but separated from the inlet port of the fluid reservoir.
Figure 6:
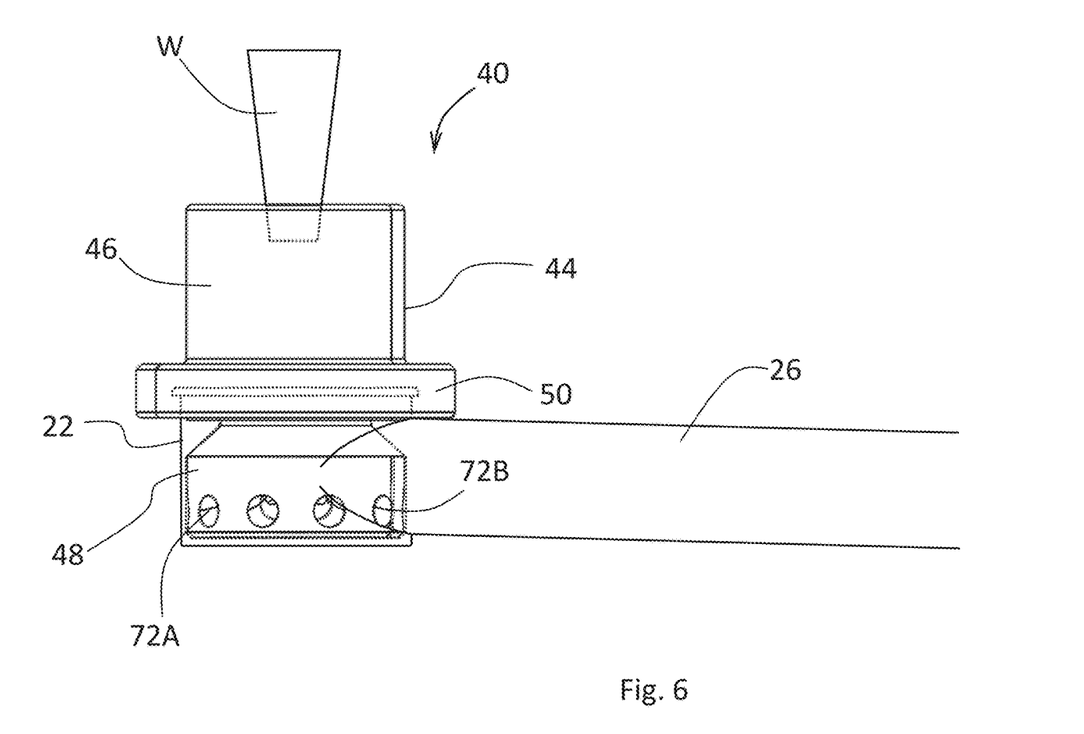
FIG. 6 illustrates the fluid vent adapter according to the embodiment shown in FIG. 2, where the fluid vent adapter is engaged with the inlet port of the fluid reservoir.

With reference now to FIG. 5, the fluid vent adapter 40 is shown in a readied state, operably attached to the fill wand W of a fluid filling machine. As shown, the fill wand W, and hence the fluid vent adapter 40 attached thereto are aligned to the inlet port 22 of the reservoir 10. The positioning/alignment of the fill wand W to the inlet port 22 may be achieved either manually, as generally utilized by a line operator, or through the implementation of suitable end-of-arm tooling located on an automated machine (i.e., robot). Regardless of how this is achieved, to begin the filling process, the fill wand W and fluid vent adapter 40 are brought into engagement with the inlet port 22 of the reservoir 10, as shown in FIG. 6.

Figure 7:
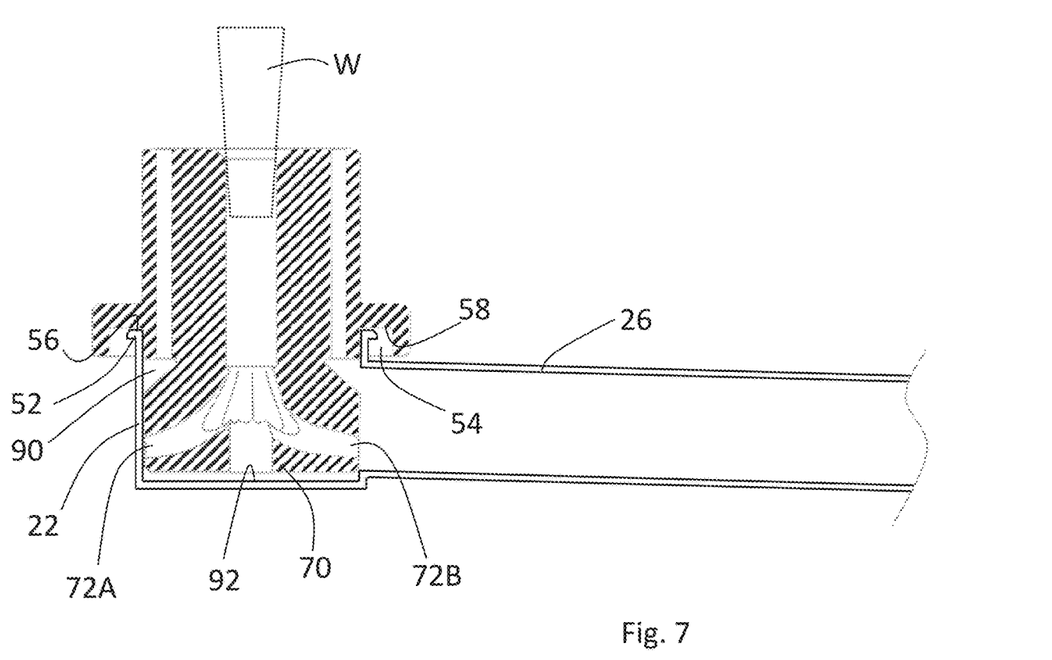
FIG. 7 depicts a side sectional view of the fluid vent adapter according to the embodiment shown in FIG. 2, where the fluid vent adapter is engaged with the inlet port of the fluid reservoir.

With reference to FIG. 7, the engagement between the fluid vent adapter 40 and the inlet port 22 is shown in sectional profile, to detail aspects of the interface therebetween. During insertion of the fluid vent adapter 40 into the inlet port 22, a proper seating is achieved upon establishing contact between the upper sealing surface 56 of the rim 52 and the recess sealing surface 58 of the annular recess 54. In this arrangement, and additionally with reference to FIG. 8, at least a portion of the radially spaced dispensing holes 72 align to an interior wall 86 of the inlet port 22. In the specific configuration shown, the dispensing holes denoted by 72A are aligned to the interior wall 86, while the dispensing holes denoted by 72B remain unobstructed. The lower portion 48 of the fluid vent adapter 40 is dimensioned such that the radially spaced dispensing holes 72A situated adjacent the interior wall 86 are substantially sealed. More specifically, the outside diameter of the lower portion 48 is dimensioned for a close tolerance fit relative to the inside diameter of the inlet port 22, therein establishing a substantially sealed interface between the dispensing holes 72A and the adjacent interior wall 86. Accordingly, upon delivery of the washer fluid through the fluid vent adapter 40, the fluid is generally directed in a manner denoted by arrows A. In other words, by virtue of blocking at least a portion of the radially spaced dispensing holes 72A, the fluid vent adapter 40 permits for a preferred directional flow of washer fluid through the unobstructed dispensing holes 72B, in the direction of the extension tube 26. As the washer fluid is delivered in a generally horizontal direction, the fluid flow is less turbulent, permitting for greater flow of fluid into the reservoir 10, while permitting for the egress of air back through the fluid vent adapter.

Figure 8:
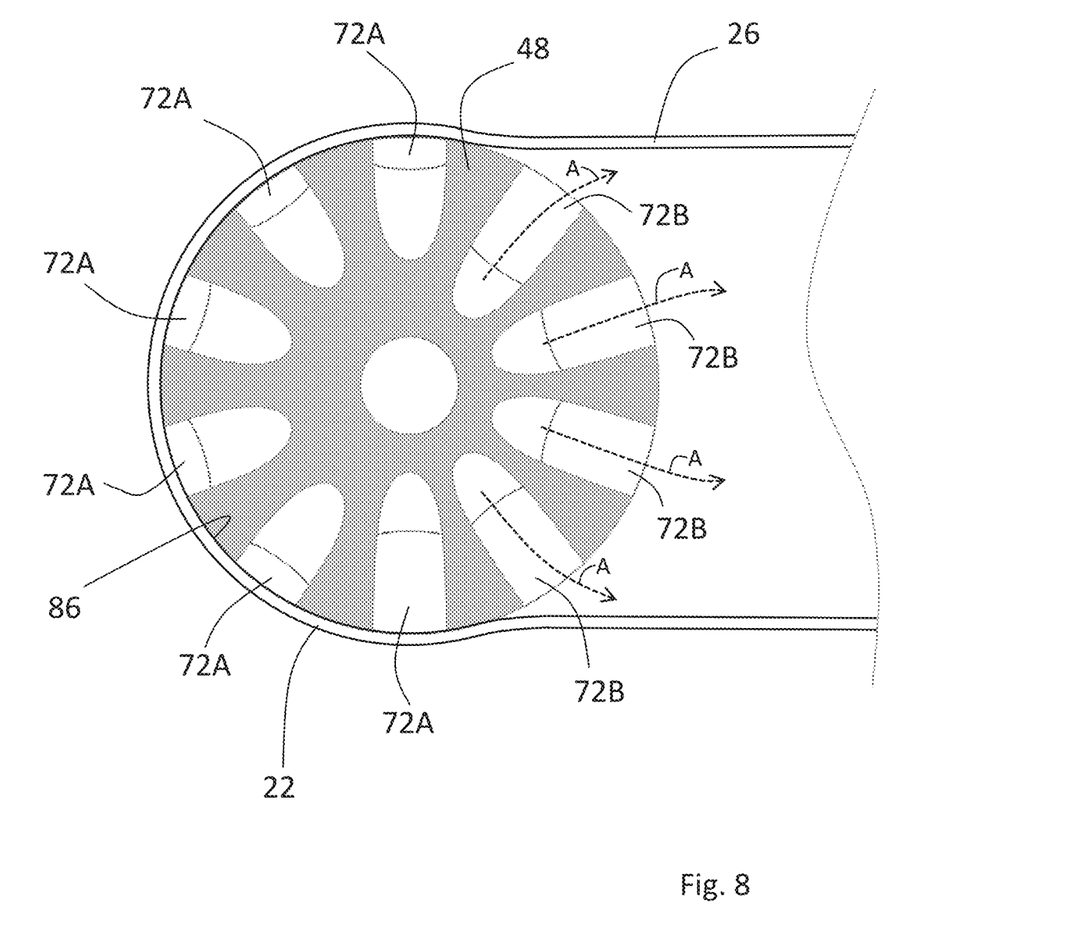
FIG. 8 depicts a top sectional view of the fluid vent adapter according to the embodiment shown in FIG. 2, where the fluid vent adapter is engaged with the inlet port of the fluid reservoir.

It will be appreciated that the egress of air through the fluid vent adapter 40 should not be obstructed in the same way by the adjacent interior wall 86 of the inlet port 22, as detailed for the radially spaced dispensing holes 72A. The incorporation of the annular vent channel 82 establishes an unobstructed circumferential zone 90 for the plurality of vent channels 80, so that escaping air is not restricted to a lesser number of vent channels 80 by the inlet port 22 wall structure. As air is driven from the reservoir 10 during the filling operation, the escaping air is able to flow around the annular vent channel 82, ensuring an adequate volumetric exchange to prevent a buildup of pressure within the reservoir 10. In addition, the plurality of vent channels 80 ensures that in the event one or more of the channels are plugged or otherwise obstructed by washer fluid, there remains a sufficient number of vent channels 80 to accommodate the required air change to avoid a pressure buildup.

In some embodiments, the length of the plurality of vent channels 80 may be longer, or shorter, to accommodate a predetermined amount of fluid backflow into the vent channels. For example, the distance from the annular vent channel 82 upwards towards the top end 68, that is the longitudinal length of the upper portion 46 may be increased to accommodate a greater volume of backflow, which may be preferred for a longer filling operation, for example when filling a larger recipient fluid reservoir.

In some embodiments, it may be advantageous to increase the spacing between the bottom end 70 of the lower portion 48, and the base wall 92, to permit for a greater volume of washer fluid to flow from the central fill conduit 66. In particular, a larger spacing between the bottom end 70 and the base wall 92 may be implemented where there is an expected increase in back pressure due to the number of radially spaced dispensing holes being blocked. It will be appreciated that these spacing variances may be achieved by altering the longitudinal dimension of the lower portion 48 of the fluid vent adapter 40.

The fluid vent adapter 40 may be created in a number of ways. For example, it may be created using an additive manufacturing process, that permits the internal voids (i.e. conduits, channels, etc.), to be surrounded by solid material. Examples of suitable additive manufacturing processes that can be used to create the fluid vent adapter 40 include, but are not limited to, direct metal laser sintering (DMLS), electron beam melting (EBM), selective heat sintering (SHS), selective laser melting (SLM) and selective laser sintering (SLS). The fluid vent adapter 40 may be formed of any suitable material that can be utilized in the selected additive manufacturing process. Suitable materials include, but are not limited to, metals (i.e. steel, aluminum, brass, and other alloys) and polymers (i.e. elastomers suited for 3D printing). An additional methodology that may be used with metals (i.e. steel, aluminum, brass, and other alloys) includes lost foam casting.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. A fluid vent adapter for filling a reservoir, the vent adapter comprising:
    a primary body including an upper portion and a lower portion;
    a central fill conduit for delivering a fluid into the reservoir, the central fill conduit being connected to a plurality of radially spaced dispensing holes arranged on the lower portion; and
    a plurality of vent channels for permitting the egress of air from the reservoir during filling,
    wherein upon inserting the vent adapter into an inlet port on the reservoir, a first portion of the radially spaced dispensing holes are blocked and a second portion of the radially spaced dispensing holes are unobstructed, and
    wherein an outside diameter of the lower portion is dimensioned for a close tolerance fit relative to an inside diameter of the inlet port of the reservoir, to establish a substantially sealed relationship between the inlet port and the dispensing holes being blocked.

2. The fluid vent adapter according to claim 1, wherein the upper portion is configured to be releasably attachable to an output end of a fluid fill wand.

3. The fluid vent adapter according to claim 1, wherein the lower portion is configured to be releasably attachable to the inlet port of the reservoir.

4. The fluid vent adapter according to claim 1, wherein the upper portion and the lower portion are delimited by an annular seat.

5. The fluid vent adapter according to claim 4, wherein the annular seat provides on an underside thereof an annular recess having a sealing surface configured to seal upon a rim formed as part of the inlet port of the reservoir.

6. The fluid vent adapter according to claim 1, wherein the central fill conduit extends completely through the primary body from a top end situated on the upper portion, through to a bottom end situated on the lower portion.

7. The fluid vent adapter according to claim 1, wherein the second portion of the radially spaced dispensing holes redirect at least a portion of the fluid being dispensed into a generally horizontal flow path on egress from the lower portion of the fluid vent adapter.

8. The fluid vent adapter according to claim 4, wherein the vent channels extend through the upper portion of the primary body from an annular vent channel proximal the annular seat upwards to a top end on the upper portion.

9. The fluid vent adapter according to claim 1, wherein the adapter is formed using an additive manufacturing process.

10. A fluid vent adapter for filling a reservoir of an automobile, the reservoir including a hollow vessel configured to hold a fluid, an extension tube extending in a generally horizontal configuration from the hollow vessel, an inlet port fluidly coupled to the extension tube, and an outlet port fluidly coupled to hollow vessel, the vent adapter comprising:
    a primary body including an upper portion and a lower portion, the lower portion being configured to be releasably attachable to the inlet port of the reservoir;
    a central fill conduit for delivering a fluid into the reservoir, the central fill conduit being fluidly connected to a plurality of radially spaced dispensing holes arranged on the lower portion; and
    a plurality of vent channels for permitting the egress of air from the reservoir during filling,
    wherein upon inserting the vent adapter into the inlet port on the reservoir, a first portion of the radially spaced dispensing holes are blocked and a second portion of the radially spaced dispensing holes are unobstructed and in fluid communication with the extension tube of the reservoir, and
    wherein an outside diameter of the lower portion is dimensioned for a close tolerance fit relative to an inside diameter of the inlet port of the reservoir to establish a substantially sealed relationship between the inlet port and the dispensing holes being blocked.

11. The fluid vent adapter according to claim 10, wherein the upper portion is configured to be releasably attachable to an output end of a fluid fill wand.

12. The fluid vent adapter according to claim 10, wherein the lower portion is configured to be releasably attachable to the inlet port of the reservoir.

13. The fluid vent adapter according to claim 10, wherein the upper portion and the lower portion are delimited by an annular seat.

14. The fluid vent adapter according to claim 13, wherein the annular seat provides on an underside thereof an annular recess having a sealing surface configured to seal upon a rim formed as part of the inlet port of the reservoir.

15. The fluid vent adapter according to claim 10, wherein the central fill conduit extends completely through the primary body from a top end situated on the upper portion, through to a bottom end situated on the lower portion.

16. The fluid vent adapter according to claim 10, wherein the second portion of the radially spaced dispensing holes redirect at least a portion of the fluid being dispensed into a generally horizontal flow path on egress from the lower portion of the fluid vent adapter.

17. The fluid vent adapter of claim 16, wherein the first portion of radially spaced dispensing holes includes a first amount of the radially spaced dispending holes and the second portion of radially spaced dispensing holes includes a second amount of the radially spaced dispensing holes, the first amount being greater than the second amount.

18. The fluid vent adapter according to claim 13, wherein the vent channels extend through the upper portion of the primary body from an annular vent channel proximal the annular seat upwards to a top end on the upper portion.

19. The fluid vent adapter according to claim 10, wherein the adapter is formed using an additive manufacturing process.

20. The fluid vent adapter of claim 10, wherein the reservoir is configured for holding windshield washer fluid.

* * * * *